United States Patent
Liu et al.

(10) Patent No.: US 8,792,208 B1
(45) Date of Patent: Jul. 29, 2014

(54) METHOD FOR PROVIDING SIDE SHIELDS HAVING NON-CONFORMAL REGIONS FOR A MAGNETIC RECORDING TRANSDUCER

(75) Inventors: Feng Liu, San Ramon, CA (US); Yugang Wang, Milpitas, CA (US); Zhigang Bai, Milpitas, CA (US); Hongzhou Jiang, Fremont, CA (US); Tao Pan, San Jose, CA (US); Shaoping Li, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/481,158

(22) Filed: May 25, 2012

(51) Int. Cl.
    *G11B 5/11* (2006.01)
(52) U.S. Cl.
    USPC .................................................. 360/125.03
(58) Field of Classification Search
    USPC ............. 360/123.12, 123.37, 123.58, 125.03, 360/125.3, 319
    See application file for complete search history.

(56) References Cited

U.S. PATENT DOCUMENTS

| | | |
|---|---|---|
| 6,504,675 B1 | 1/2003 | Shukh et al. |
| 6,738,223 B2 | 5/2004 | Sato et al. |
| 6,829,819 B1 | 12/2004 | Crue, Jr. et al. |
| 6,891,697 B2 | 5/2005 | Nakamura et al. |
| 6,944,938 B1 | 9/2005 | Crue, Jr. et al. |
| 6,952,325 B2 | 10/2005 | Sato et al. |
| 7,002,775 B2 | 2/2006 | Hsu et al. |
| 7,070,698 B2 | 7/2006 | Le |
| 7,206,166 B2 | 4/2007 | Notsuke et al. |
| 7,324,304 B1 | 1/2008 | Benakli et al. |
| 7,367,112 B2 | 5/2008 | Nix et al. |
| 7,467,461 B2 | 12/2008 | Bonhote et al. |
| 7,508,626 B2 | 3/2009 | Ichihara et al. |
| 7,649,712 B2 | 1/2010 | Le et al. |
| 7,663,839 B2 | 2/2010 | Sasaki et al. |
| 7,715,152 B2 * | 5/2010 | Okada et al. .................. 360/319 |
| 7,768,743 B2 | 8/2010 | Guthrie et al. |
| 7,889,456 B2 * | 2/2011 | Jiang et al. ............... 360/125.08 |
| 7,894,159 B2 * | 2/2011 | Lengsfield et al. ...... 360/125.03 |
| 7,898,773 B2 | 3/2011 | Han et al. |
| 7,920,359 B2 | 4/2011 | Maruyama et al. |
| 7,979,978 B2 | 7/2011 | Han et al. |
| 8,015,692 B1 | 9/2011 | Zhang et al. |
| 8,018,677 B1 | 9/2011 | Chung et al. |
| 8,027,125 B2 | 9/2011 | Lee et al. |
| 8,066,892 B2 | 11/2011 | Guthrie et al. |
| 8,117,738 B2 | 2/2012 | Han et al. |
| 8,120,874 B2 | 2/2012 | Hsiao et al. |
| 8,125,732 B2 | 2/2012 | Bai et al. |
| 8,136,224 B1 | 3/2012 | Sun et al. |
| 8,136,225 B1 | 3/2012 | Zhang et al. |

(Continued)

OTHER PUBLICATIONS

Mallary et al., "One Terabit per Square Inch Perpendicular Recording Conceptual Design", IEEE Transactions on Magnetics, vol. 38, No. 4, Jul. 2002, pp. 1719-1724.

*Primary Examiner* — Angel Castro

(57) ABSTRACT

A method and system provide a magnetic recording transducer having air-bearing surface (ABS). The magnetic recording transducer includes a pole, a side shield, a nonmagnetic gap between the side shield and the pole and at least one coil for energizing the pole. The pole has a pole tip proximate to the ABS. The side shield includes at least one nonconformal portion that extends from a throat height in a stripe height direction perpendicular to the ABS and is nonconformal with the pole. The spacing between the nonconformal portion(s) of the side shield and the pole varies based on a distance from the ABS.

16 Claims, 8 Drawing Sheets

Top View

(56) References Cited

U.S. PATENT DOCUMENTS

| | | |
|---|---|---|
| 8,141,235 B1 | 3/2012 | Zhang |
| 8,149,536 B1 | 4/2012 | Yang et al. |
| 8,164,852 B2 * | 4/2012 | Lee et al. ................. 360/125.03 |
| 8,166,631 B1 | 5/2012 | Tran et al. |
| 8,166,632 B1 | 5/2012 | Zhang et al. |
| 8,231,796 B1 * | 7/2012 | Li et al. ........................... 216/22 |
| 8,262,918 B1 | 9/2012 | Li et al. |
| 8,277,669 B1 | 10/2012 | Chen et al. |
| 8,284,517 B1 | 10/2012 | Sun et al. |
| 8,334,093 B2 | 12/2012 | Zhang et al. |
| 8,341,826 B1 | 1/2013 | Jiang et al. |
| 8,400,731 B1 | 3/2013 | Li et al. |
| 8,404,128 B1 | 3/2013 | Zhang et al. |
| 8,409,453 B1 | 4/2013 | Jiang et al. |
| 8,419,954 B1 | 4/2013 | Chen et al. |
| 8,456,778 B2 * | 6/2013 | Min et al. .................. 360/125.03 |
| 8,520,336 B1 * | 8/2013 | Liu et al. .................... 360/125.1 |
| 2003/0076630 A1 | 4/2003 | Sato et al. |
| 2004/0184191 A1 | 9/2004 | Ichihara et al. |
| 2005/0117251 A1 | 6/2005 | Matono et al. |
| 2006/0044681 A1 | 3/2006 | Le et al. |
| 2006/0044682 A1 | 3/2006 | Le et al. |
| 2006/0067005 A1 | 3/2006 | Jayasekara |
| 2006/0082924 A1 | 4/2006 | Etoh et al. |
| 2007/0253107 A1 | 11/2007 | Mochizuki et al. |
| 2008/0002309 A1 | 1/2008 | Hsu et al. |
| 2008/0151437 A1 | 6/2008 | Chen et al. |
| 2008/0180861 A1 | 7/2008 | Maruyama et al. |
| 2008/0253035 A1 | 10/2008 | Han et al. |
| 2008/0273276 A1 | 11/2008 | Guan |
| 2008/0273277 A1 | 11/2008 | Guan et al. |
| 2008/0278861 A1 | 11/2008 | Jiang et al. |
| 2008/0304186 A1 | 12/2008 | Watanabe et al. |
| 2009/0091861 A1 | 4/2009 | Takano |
| 2009/0154019 A1 | 6/2009 | Hsiao et al. |
| 2009/0154026 A1 | 6/2009 | Jiang et al. |
| 2009/0168241 A1 | 7/2009 | Mochizuki et al. |
| 2009/0279206 A1 | 11/2009 | Yang et al. |
| 2010/0061016 A1 | 3/2010 | Han et al. |
| 2010/0146773 A1 | 6/2010 | Li et al. |
| 2010/0155363 A1 | 6/2010 | Pentek et al. |
| 2010/0254042 A1 * | 10/2010 | Contreras et al. ........ 360/123.05 |
| 2010/0302681 A1 | 12/2010 | Mino et al. |
| 2011/0051293 A1 | 3/2011 | Bai et al. |
| 2011/0146060 A1 | 6/2011 | Han et al. |
| 2011/0151279 A1 | 6/2011 | Allen et al. |
| 2011/0222188 A1 | 9/2011 | Etoh et al. |
| 2012/0012555 A1 | 1/2012 | Yan et al. |
| 2012/0044598 A1 * | 2/2012 | Bai et al. ................... 360/123.12 |

* cited by examiner

ABS View

Top View

ABS View

Top View

ABS View

Top View

ABS View

Top View

ABS View

Top View

ABS View

Top View

METHOD FOR PROVIDING SIDE SHIELDS HAVING NON-CONFORMAL REGIONS FOR A MAGNETIC RECORDING TRANSDUCER

BACKGROUND

FIGS. 1 and 2 depict air-bearing surface (ABS) and top views, respectively, of a portion of a conventional PMR transducer 10. The conventional transducer 10 includes an intermediate layer 12. The intermediate layer 12 is the layer on which the pole is formed. The intermediate layer 12 may be a leading edge shield or a nonmagnetic layer. A gap layer 20 that may separate the pole 20 from the underlying intermediate layer 12 is shown. The conventional pole 30 and side shield 40 are also shown. For clarity, seed layer(s) are not separately depicted.

The side shields 40 are conformal to the pole 30. Thus, the thickness of the gap layer 20, t, does not vary in the down track direction. Similarly, the thickness of the gap layer 20 does not vary in a direction perpendicular to the ABS until the side shields 40 terminate at the throat height. Stated differently, the walls of the side shields 40 closest to the sidewalls of the pole 30 are substantially the same distance and have substantially the same profile as the pole 30.

Although the conventional transducer 10 may be used to write to media, there may be drawbacks at higher recording densities. At higher recording densities, the components 12, 20, 30 and 40 of the conventional transducer 10 are scaled to smaller sizes. As a result, the write field of the conventional pole 30 may be significantly reduced. In addition, the reverse overwrite loss may be increased. These developments are undesirable. Although these issues may be partially addressed by removal of the side shields 40, this is also undesirable. The side shields 40 are desired to prevent adjacent track interference and to mitigate wide track erasure that may be associated with a smaller side shield throat height.

Accordingly, what is needed is an improved transducer having a side shields.

SUMMARY

A method and system provide a magnetic recording transducer having air-bearing surface (ABS). The magnetic recording transducer includes a pole, a side shield, a nonmagnetic gap between the side shield and the pole and at least one coil for energizing the pole. The pole has a pole tip proximate to the ABS. The side shield includes at least one nonconformal portion that extends from a throat height in a stripe height direction perpendicular to the ABS and is nonconformal with the pole. The spacing between the nonconformal portion(s) of the side shield and the pole varies based on a distance from the ABS.

DETAILED DESCRIPTION OF THE PREFERRED EMBODIMENTS

Figure 1:
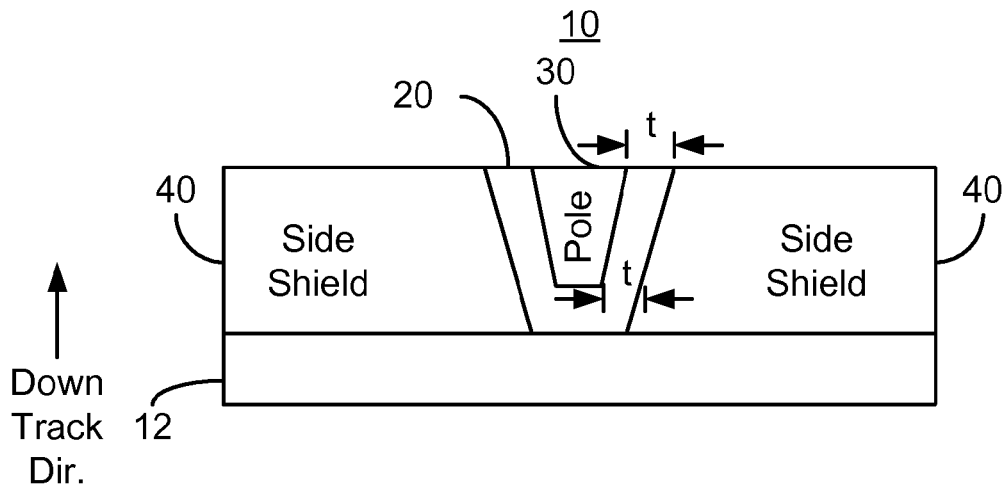
FIG. 1 depicts an ABS view of a conventional magnetic transducer.
Figure 2:
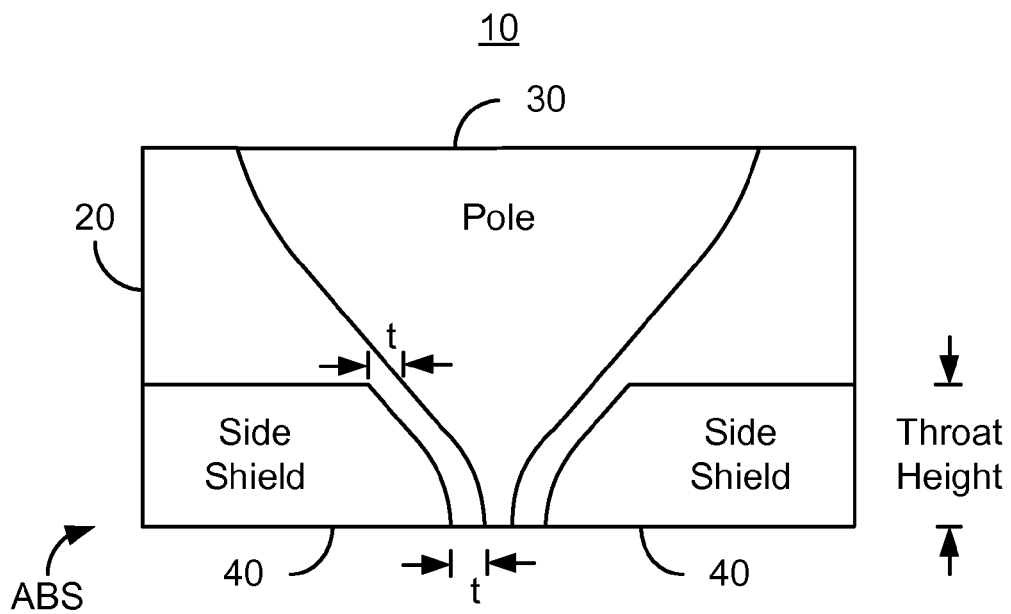
FIG. 2 depicts a top view of a conventional magnetic transducer.
Figure 3:
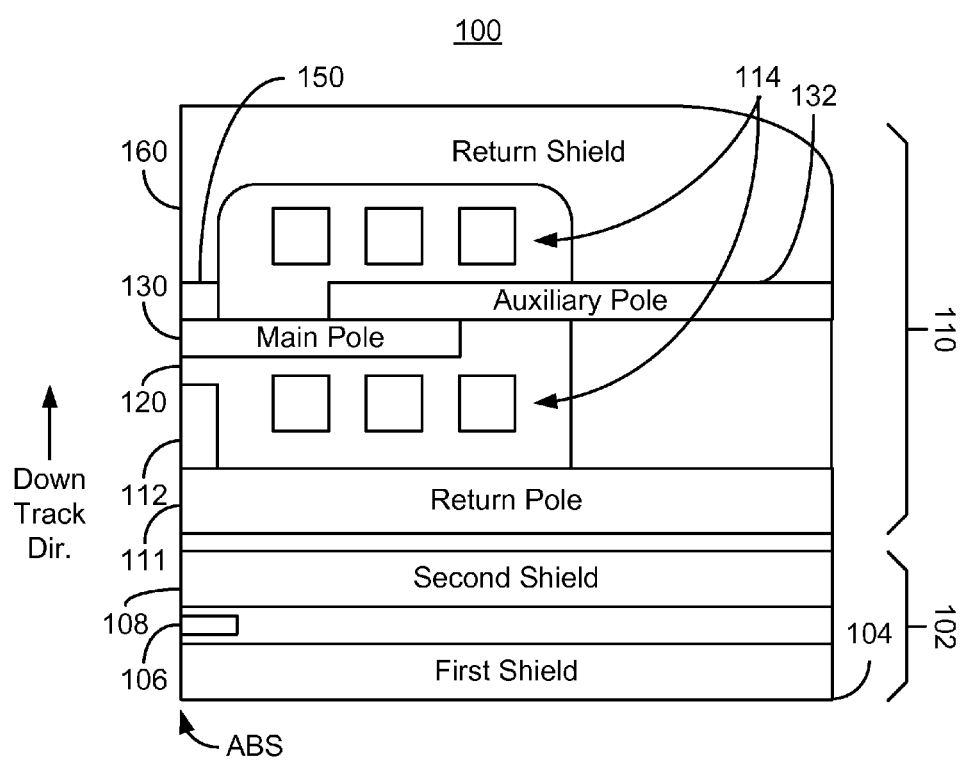
FIG. 3 depicts a side view of an exemplary embodiment of a magnetic transducer.
Figure 4:
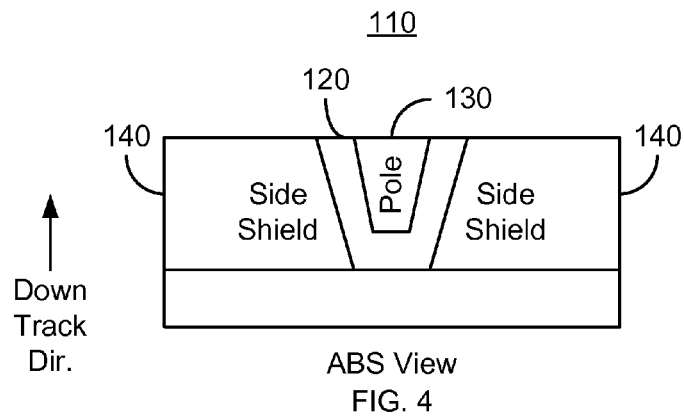
FIG. 4 depicts an ABS view of an exemplary embodiment of a magnetic transducer.
Figure 5:
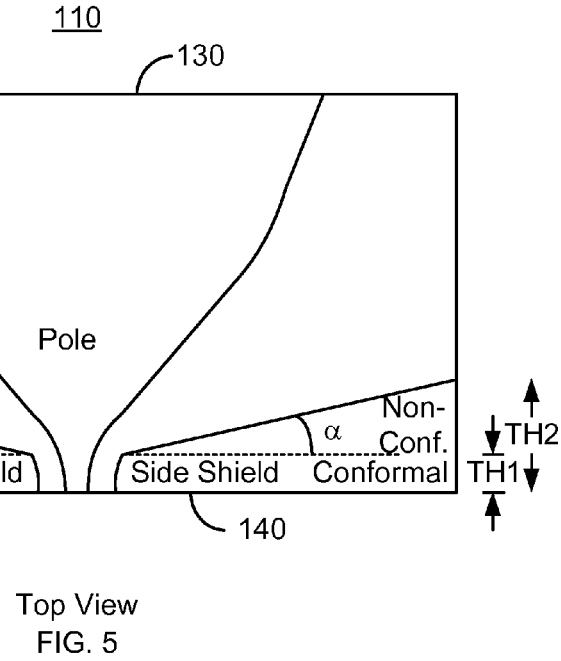
FIG. 5 depicts a top view of an exemplary embodiment of a magnetic transducer.

FIGS. 3-5 depict various views of an exemplary embodiment of a portion of a magnetic read head. FIG. 3 depicts a side view of the head including a read transducer 102 and a write transducer 110. FIGS. 4-5 depict ABS and plan (top) views of the write transducer 110. For clarity, FIGS. 3-5 are not to scale. Although shown as part of a merged head, in other embodiments, the write transducer 110 may be part of a stand-alone write head. The head of which the read transducer 102 and write transducer 110 are a part is part of a disk drive having a media, a slider and the head coupled with the slider. Further, only a portion of the components of the read transducer 102 and write transducer 110 are depicted.

The read transducer 102 includes soft magnetic shields 104 and 108 and a read sensor 106. The sensor 106 may be a giant magnetoresistive or tunneling magnetoresistive sensor. Although the second shield 108 of the read transducer 102 is shown as separate from the return pole 111, in some embodiments, these structures are merged.

The write transducer 110 includes optional return pole 111, main pole 130, optional leading edge shield 112, gap 120, coils 114, auxiliary pole 132, write gap 150 and return shield 160. As can be seen in FIG. 4, the main pole 130 has sidewalls having a reverse angle. As a result, the top of the main pole 130 is wider than its bottom. In addition, as can be seen in FIG. 5, the nose of the pole 130 diverges from the ABS at some angle, termed the writer nose chisel angle. The value of the writer nose chisel angle may vary between designs. Further, the sidewalls of the pole 130 are curved in the stripe height direction perpendicular to the ABS. The pole 130 includes magnetic material(s) and may be a multilayer and/or an alloy. The gap 120 is nonmagnetic and separates the pole 130 from at least the side shields 140. The gap 120 may, for example, have a width of 40-120 nanometers. In the embodiment shown, a portion of the gap 120 resides below the pole 130.

The side shields 140 include a high permeability material such as NiFe. In some embodiments, the side shields 140 may be an alloy and/or a multilayer. The side shields 140 are conformal to the pole in the down track direction. Thus, in the embodiment shown, the thickness of the side gap 120 is substantially constant for any plane parallel to the ABS. However, in other embodiments, the side shields 140 may not be conformal with the pole in the down track direction. For example, the side gap 120 may be thinner at the leading edge than at the trailing edge. Alternatively, the side gap 120 may be thicker at the leading edge than at the trailing edge. Although shown only as side shields 140, in other embodiments, the shields 140 may form a wraparound shield. Although not shown, a portion of the side shield(s) 140 that is not shown may extend in a direction perpendicular to the stripe height and down track directions.

Each of the side shields 140 includes at least one nonconformal portion. The embodiment shown in FIGS. 4-5 includes a single nonconformal portion that extends from a first throat height TH1 to a second throat height TH2 in the stripe height direction. Thus, the spacing between the nonconformal portion of the side shields 140 and the pole 130 varies based on distance from the ABS. In the embodiment shown in FIGS. 3-5, the spacing between the pole 130 and the side shields 140 increases monotonically with distance from the ABS in the nonconformal region. However, other variations in the spacing between the pole 130 and the side shields 140 are possible. In some embodiments, the thickness of the side shields 140 is TH2. The nonconformal portion of the shields 140 has a takeoff angle, α, from a plane parallel to the ABS. In some embodiments, the takeoff angle is at least fifteen degrees and not more than thirty degrees. However, in other embodiments, the takeoff angle may have another value. In some embodiments, the takeoff angle is significantly smaller than the nose chisel angle, resulting in the side shields 140 rapidly diverging from the pole 130. The second throat height, which may also be the side shield depth, may be at least one hundred nanometers. In some embodiments, the second throat height is at least two hundred fifty and not more than five hundred nanometers. The first throat height is at least thirty nanometers. In some embodiments, the first throat height is at least sixty nanometers and not more than one hundred fifty nanometers. In some such embodiments, the first throat height is not more than sixty nanometers.

In the embodiment shown, the side shields 140 also have a conformal portion that extends from the ABS to the first throat height TH1. The conformal portion resides between the nonconformal portion of the side shields 140 and the ABS. Although only one nonconformal portion and one conformal portion is shown for each shield, one or more nonconformal portions and/or one or more conformal portions may be included in the side shields 140. Each nonconformal portion may adjoin another nonconformal portion having a different takeoff angle and/or may adjoin a conformal portion.

Use of the side shields 140 having nonconformal portions may improve the performance of the transducer 110 and thus the head 100. Because the side shields 140 are still present, adjacent track interference (ATI) and wide area track erasure (WATER) may be mitigated. The ability of the side shields to reduce ATI and WATER may be enhanced by the presence of the conformal region near the ABS. However, because the side shields 140 diverge from the pole 130 in the nonconformal regions, less of the magnetic field provided by the pole 130 is shielded from the media (not shown) by the side shields 140. Thus, a higher write field may be provided by the pole 130. In addition, the field gradient for the pole 130 may also be improved. Thus, performance of the transducer 110, particularly at higher recording densities may be improved.

Figure 6:
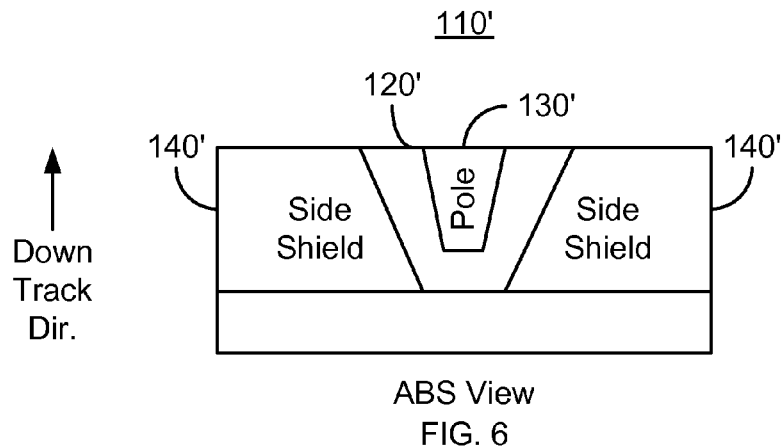
FIG. 6 depicts an ABS view of another exemplary embodiment of a magnetic transducer.
Figure 7:
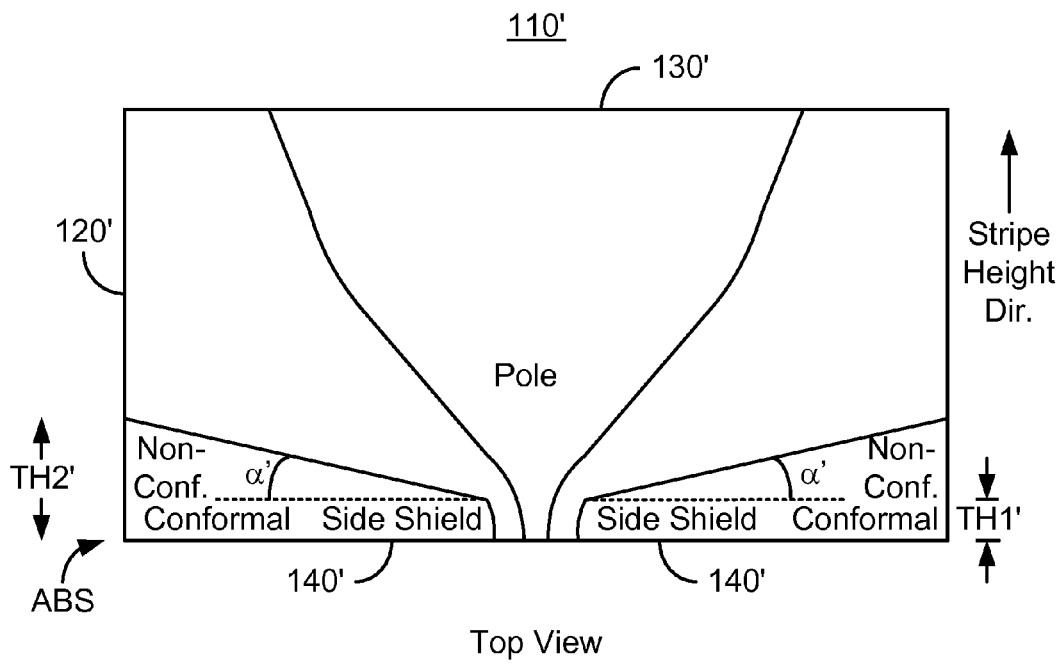
FIG. 7 depicts a top view of another exemplary embodiment of a magnetic transducer.

FIGS. 6 and 7 depict ABS and plan views, respectively, of another exemplary embodiment of a portion of a magnetic write transducer 110'. For clarity, FIGS. 6-7 are not to scale. The write transducer 110' may be part of a write head or may be part of a merged head 100 that also includes a read transducer 102. Thus, the write transducer 110' may be used in the head depicted in FIGS. 3-5. FIGS. 6-7 thus correspond to FIGS. 4-5. The head of which the write transducer 110' is a part is part of a disk drive having a media, a slider and the head coupled with the slider. The magnetic write transducer 110' corresponds to the magnetic write transducer 110. Similar components have analogous labels. The magnetic transducer 110' thus includes a gap 120', pole 130' and side shields 140' analogous to the gap 120, the pole 130 and the side shields 140 of the transducer 110. Thus, the components 120', 130', and 140' have a similar structure and function to the components 120, 130, and 140, respectively.

The side shields 140' are analogous to the side shields 140. Although shown only as side shields 140', in other embodiments, the shields 140' may form a wraparound shield. Although not shown, a portion of the side shield(s) 140' that is not shown may extend in a direction perpendicular to the stripe height and down track directions.

The side shields 140' include a conformal portion between the ABS and the first throat height TH1' and a nonconformal portion between the first throat height and a second throat height TH2'. Thus, the spacing between the nonconformal portion of the side shields 140' and the pole 130' varies with distance from the ABS. In the embodiment shown in FIGS. 6-7, the spacing between the pole 130' and the side shields 140' increases monotonically with distance from the ABS in the nonconformal region. However, other variations in the spacing between the pole 130' and the side shields 140' are possible. In some embodiments, the thickness of the side shields 140' is TH2. The nonconformal portion of the shields 140' has a takeoff angle, α', from a plane parallel to the ABS. In some embodiments, the takeoff angle is at least fifteen degrees and not more than thirty degrees. However, in other embodiments, the takeoff angle may have another value. In some embodiments, the takeoff angle is significantly smaller than the nose chisel angle, resulting in the side shields 140' rapidly diverging from the pole 130'. The second throat height, which may also be the side shield depth, may be at least one hundred nanometers. In some embodiments, the second throat height is at least two hundred fifty and not more than five hundred nanometers. The first throat height is at least thirty nanometers. In some embodiments, the first throat height is at least sixty nanometers and not more than one hundred fifty nanometers. In some such embodiments, the first throat height is not more than sixty nanometers. In the embodiment shown, the side shields 140' also have a conformal portion that extends from the ABS to the first throat height TH1'. The conformal portion resides between the nonconformal portion of the side shields 140' and the ABS. In the embodiment shown, each side shield 140 includes one nonconformal portion and one conformal portion. However, in other embodiments, multiple nonconformal portions and/or multiple conformal portions may be included.

In the embodiment shown in FIGS. 6-7, the side shields 140' are not conformal to the pole 130' in the down track direction. Thus, the thickness of the side gap 120' changes in the down track direction. In the embodiment shown, the thickness/width of the side gap 120' increases in the down track direction. However, in other embodiments, the side gap 120' may vary in the down track direction in another manner. For example, the side gap 120' may decrease in thickness in the down track direction.

The transducer 110' may share the benefits of the transducer 110. Use of the side shields 140' having nonconformal portions may improve the performance of the transducer 110' and thus the head 100'. Because the side shields 140' are still present, ATI and WATER may be mitigated. The ability of the side shields 10' to reduce ATI and WATER may be enhanced by the presence of the conformal region near the ABS. However, because the side shields 140' diverge from the pole 130' in the nonconformal regions, less of the magnetic field provided by the pole 130' is shielded from the media (not shown) by the side shields 140'. Thus, a higher write field may be provided by the pole 130'. In addition, the field gradient for the pole 130' may also be improved. Thus, performance of the transducer 110', particularly at higher recording densities may be improved.

Figure 8:
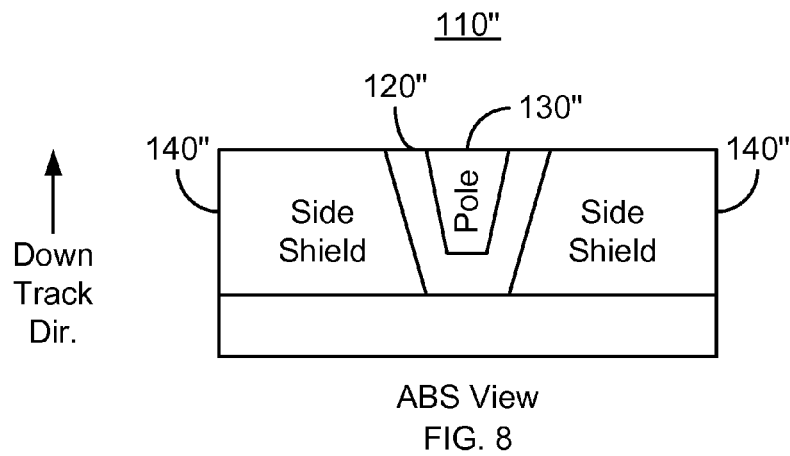
FIG. 8 depicts an ABS view of another exemplary embodiment of a magnetic transducer.
Figure 9:
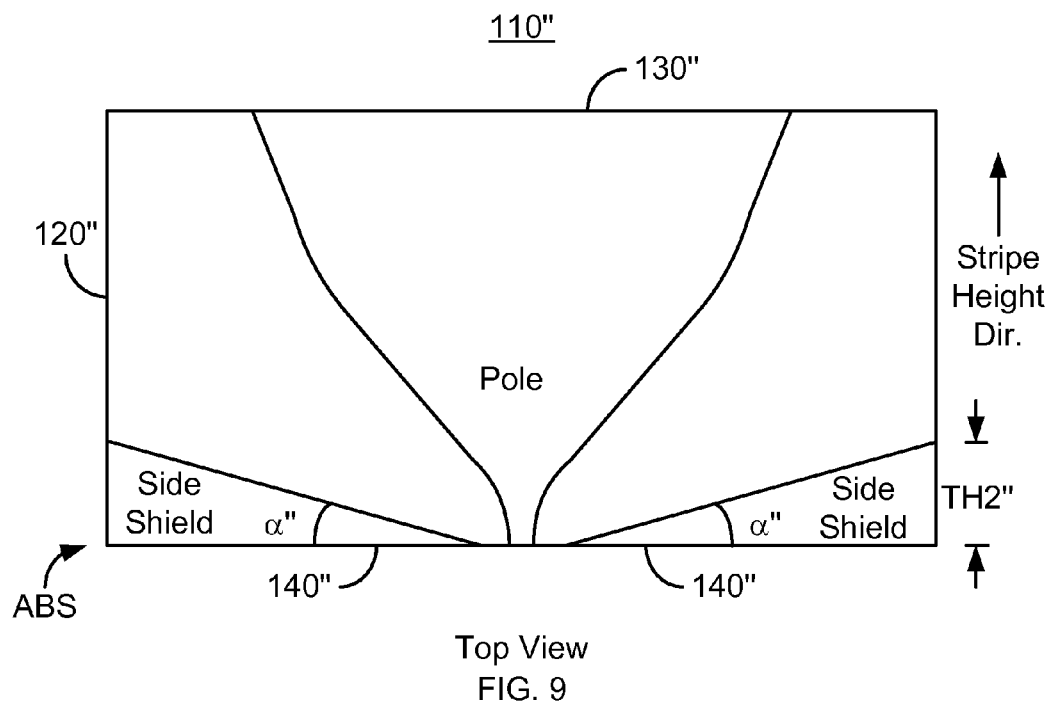
FIG. 9 depicts a top view of another exemplary embodiment of a magnetic transducer.

FIGS. 8 and 9 depict ABS and plan views, respectively, of another exemplary embodiment of a portion of a magnetic write transducer 110". For clarity, FIGS. 8-9 are not to scale. The write transducer 110" may be part of a write head or may be part of a merged head 100 that also includes a read transducer 102. Thus, the write transducer 110" may be used in the head depicted in FIGS. 3-5. FIGS. 8-9 thus correspond to FIGS. 4-5 and 6-7. The head of which the write transducer 110" is a part is part of a disk drive having a media, a slider and the head coupled with the slider. The magnetic write transducer 110" corresponds to the magnetic write transducers 110 and 110'. Similar components have analogous labels. The magnetic transducer 110" thus includes a gap 120", pole 130" and side shields 140" analogous to the gap 120/120', the pole 130/130' and the side shields 140/140' of the transducer 110/110'. Thus, the components 120", 130", and 140" have a similar structure and function to the components 120, 130, and 140, respectively.

The side shields 140" are analogous to the side shields 140 and 140'. Although shown only as side shields 140", in other embodiments, the shields 140" may form a wraparound shield. Although not shown, a portion of the side shield(s) 140" that is not shown may extend in a direction perpendicular to the stripe height and down track directions.

The side shields 140" are nonconformal to the pole. Stated differently, the first throat height (not shown) to which a conformal portion would extend is zero. The nonconformal portion thus extends from the ABS to the second throat height TH2". The spacing between the side shields 140" and the pole 130" varies with distance from the ABS. In the embodiment shown in FIGS. 8-9, the spacing between the pole 130" and the side shields 140" increases monotonically with distance from the ABS. However, other variations in the spacing between the pole 130" and the side shields 140" are possible. In some embodiments, the thickness of the side shields 140" is TH2". Each of the shields 140" has a takeoff angle, α", from the ABS. In some embodiments, the takeoff angle is at least fifteen degrees and not more than thirty degrees. However, in other embodiments, the takeoff angle may have another value. In some embodiments, the takeoff angle is significantly smaller than the nose chisel angle, resulting in the side shields 140" rapidly diverging from the pole 130". The second throat height, which may also be the side shield depth, may be at least one hundred nanometers. In some embodiments, the second throat height is at least two hundred fifty and not more than five hundred nanometers. In the embodiment shown in FIGS. 8-9, the side shields 140" are conformal to the pole 130" in the down track direction. Thus, the thickness of the side gap 120" is substantially constant in the down track direction. However, in another embodiment, the side shields 140" may not be conformal with the pole 130" in the down track direction. In the embodiment shown, each side shield 140 includes one nonconformal portion only. However, in other embodiments, multiple nonconformal portions and/or one or more conformal portions may be included.

The transducer 110" may share the benefits of the transducers 110 and 110'. Use of the nonconformal side shields 140" may improve the performance of the transducer 110" and thus the head 100". Because the side shields 140" are still present, ATI and WATER may be mitigated. Because the side shields 140" diverge from the pole 130" in the nonconformal regions, less of the magnetic field provided by the pole 130" is shielded from the media (not shown) by the side shields 140". Thus, a higher write field may be provided by the pole 130". In addition, the field gradient for the pole 130" may also be improved. Thus, performance of the transducer 110", particularly at higher recording densities may be improved.

Figure 10:
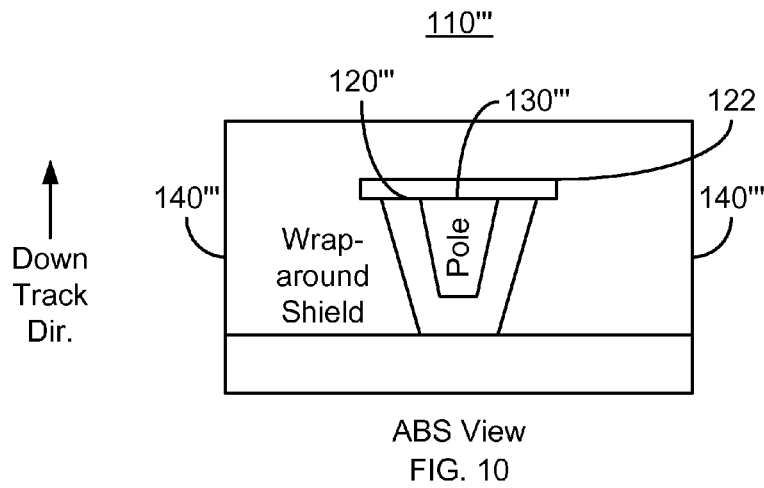
FIG. 10 depicts an ABS view of another exemplary embodiment of a magnetic transducer.
Figure 11:
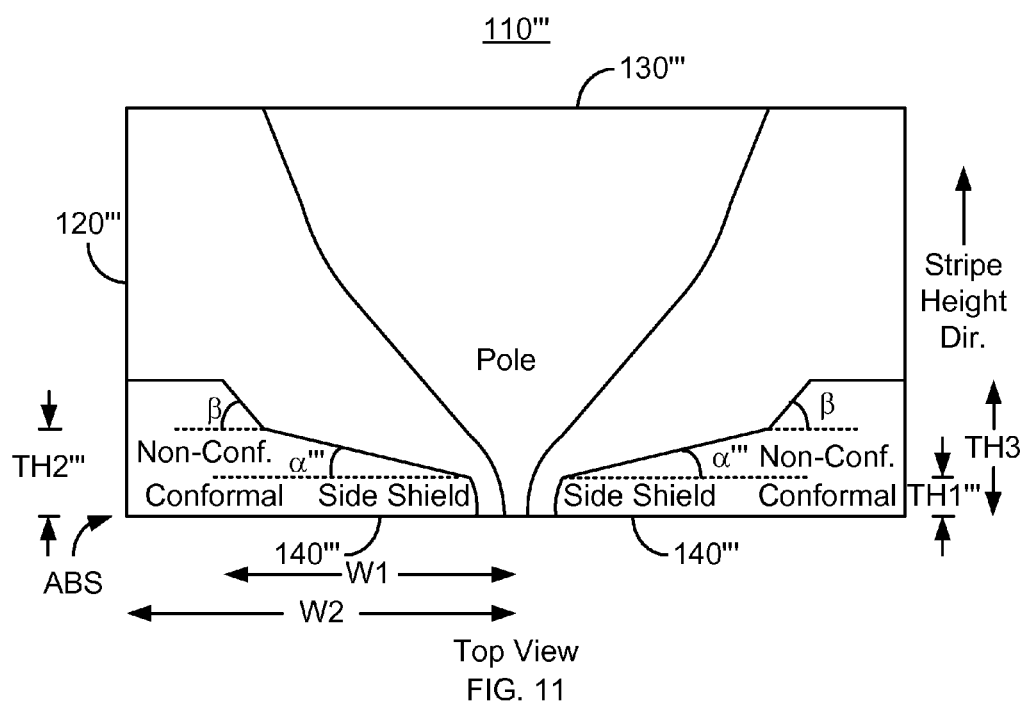
FIG. 11 depicts a top view of another exemplary embodiment of a magnetic transducer.

FIGS. 10 and 11 depict ABS and plan views, respectively, of another exemplary embodiment of a portion of a magnetic write transducer 110'''. For clarity, FIGS. 10-11 are not to scale. The write transducer 110''' may be part of a write head or may be part of a merged head 100 that also includes a read transducer 102. Thus, the write transducer 110''' may be used in the head depicted in FIGS. 3-5. FIGS. 10-11 thus correspond to FIGS. 4-5, 6-7 and 8-9. The head of which the write transducer 110''' is a part is part of a disk drive having a media, a slider and the head coupled with the slider. The magnetic write transducer 110''' corresponds to the magnetic write transducers 110, 110' and 110". Similar components have analogous labels. The magnetic transducer 110''' thus includes a gap 120''', pole 130'''' and side shields 140''' analogous to the gap 120/120'/120", the pole 130/130'/130" and the side shields 140/140'/140" of the transducer 110/110'/110". Thus, the components 120''', 130''', and 140''' have a similar structure and function to the components 120, 130, and 140, respectively. In the embodiment shown in FIGS. 10-11, the side shields 140''' are conformal to the pole 130''' in the down track direction. Thus, the thickness of the side gap 120''' is substantially constant in the down track direction. However, in another embodiment, the side shields 140''' may not be conformal with the pole 130''' in the down track direction.

The side shields 140''' are analogous to the side shields 140, 140' and 140". However, in the embodiment shown, the shields 140''' form a wraparound shield. In other embodiments, the shields 140''' may be side shields only. Although not shown, a portion of the side shield(s) 140''' that is not shown may extend in a direction perpendicular to the stripe height and down track directions.

The side shields 140''' include a conformal portion between the ABS and the first throat height TH1''' and a nonconformal portion between the first throat height and a second throat height TH2'''. An additional conformal portion is between the second throat height TH2''' and a third throat height TH3. The spacing between the nonconformal portion of the side shields 140''' and the pole 130''' varies with distance from the ABS. In the embodiment shown in FIGS. 10-11, the spacing between the pole 130''' and the side shields 140''' increases monotonically with distance from the ABS in the nonconformal region. However, other variations in the spacing between the pole 130''' and the side shields 140''' are possible. In some embodiments, the thickness of the side shields 140''' is TH2'''. The nonconformal portion of the shields 140''' closest to the ABS has a takeoff angle, α''', from a plane parallel to the ABS. In some embodiments, the takeoff angle is at least fifteen degrees and not more than thirty degrees. However, in other embodiments, the takeoff angle may have another value. In some embodiments, the takeoff angle is significantly smaller than the nose chisel angle, resulting in the side shields 140''' rapidly diverging from the pole 130'''. The additional conformal portion of the shields 140''' has an additional takeoff angle, β, from a plane parallel to the ABS.

In the embodiment shown, the side shields 140''' may be considered to include an additional nonconformal portion between widths W1 and W2. This portion of the side shields 140''' is not conformal because this edge of the shield is parallel to the ABS rather than parallel to the sides of the pole 130'''. In another embodiment, this nonconformal portion of the side shields 140''' may have another takeoff angle. Although a certain number of nonconformal portions and conformal portions are shown for each shield, another number of nonconformal portions and/or another number of conformal portions may be included in the side shields 140. Each nonconformal portion may adjoin another nonconformal portion having a different takeoff angle and/or may adjoin a conformal portion The second throat height, which may also be the side shield depth, may be at least one hundred nanometers. In some embodiments, the second throat height is at least two hundred fifty and not more than five hundred nanometers. The first throat height is at least thirty nanometers. In some embodiments, the first throat height is at least sixty nanometers and not more than one hundred fifty nanometers. In some such embodiments, the first throat height is not more than sixty nanometers. In the embodiment shown, the side shields 140''' also have a conformal portion that extends from the ABS to the first throat height TH1'''. The conformal portion resides between the nonconformal portion of the side shields 140''' and the ABS.

The transducer 110''' may share the benefits of the transducers 110, 110' and 110''. Use of the side shields 140''' having nonconformal portions may improve the performance of the transducer 110''' and thus the head 100'''. Because the side shields 140''' are still present, ATI and WATER may be mitigated. The ability of the side shields 140''' to reduce ATI and WATER may be enhanced by the presence of the conformal region near the ABS. However, because the side shields 140''' diverge from the pole 130''' in the nonconformal regions, less of the magnetic field provided by the pole 130''' is shielded from the media (not shown) by the side shields 140'''. Thus, a higher write field may be provided by the pole 130'''. In addition, the field gradient for the pole 130''' may also be improved. Thus, performance of the transducer 110''', particularly at higher recording densities may be improved.

Figure 12:
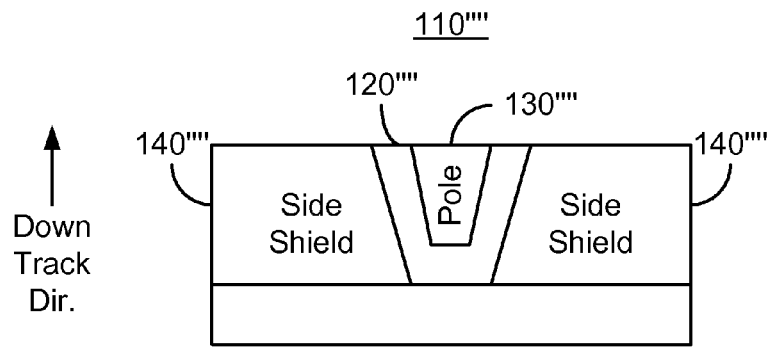
FIG. 12 depicts an ABS view of another exemplary embodiment of a magnetic transducer.
Figure 13:
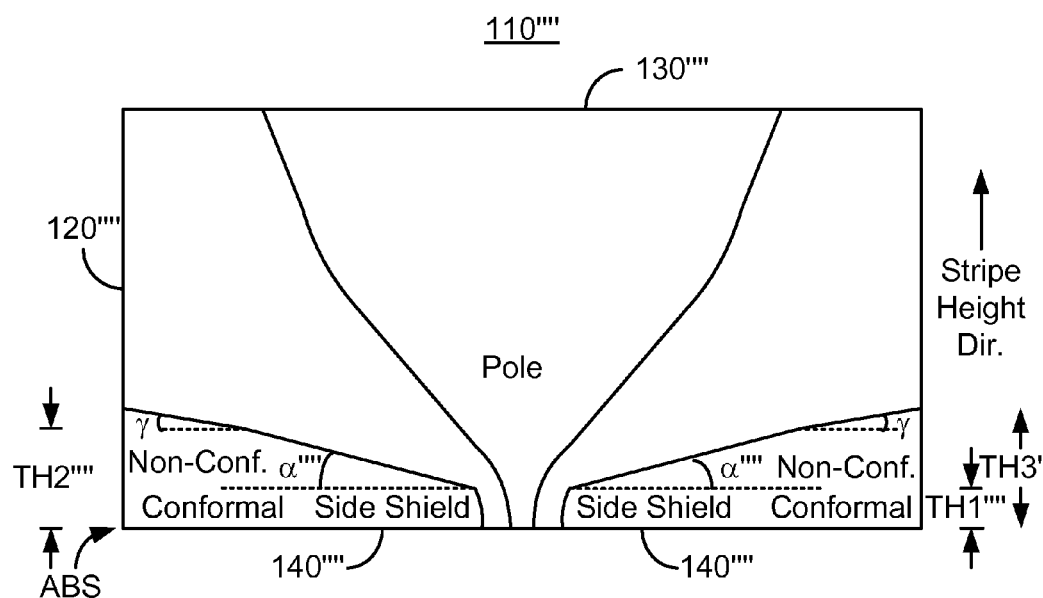
FIG. 13 depicts a top view of another exemplary embodiment of a magnetic transducer.

FIGS. 12 and 13 depict ABS and plan views, respectively, of another exemplary embodiment of a portion of a magnetic write transducer 110''''. For clarity, FIGS. 12-13 are not to scale. The write transducer 110'''' may be part of a write head or may be part of a merged head 100 that also includes a read transducer 102. Thus, the write transducer 110'''' may be used in the head depicted in FIGS. 3-5. FIGS. 12-13 thus correspond to FIGS. 4-5, 6-7, 8-9 and 12-13. The head of which the write transducer 110'''' is a part is part of a disk drive having a media, a slider and the head coupled with the slider. The magnetic write transducer 110'''' corresponds to the magnetic write transducers 110, 110', 110'' and 110'''. Similar components have analogous labels. The magnetic transducer 110'''' thus includes a gap 120'''', pole 130'''' and side shields 140'''' analogous to the gap 120/120'/120''/120''', the pole 130/130'/130''/130''' and the side shields 140/140'/140''/140''' of the transducer 110/110'/110''/110'''. Thus, the components 120'''', 130'''', and 140'''' have a similar structure and function to the components 120, 130, and 140, respectively. In the embodiment shown in FIGS. 12-13, the side shields 140'''' are conformal to the pole 130'''' in the down track direction. However, in another embodiment, the side shields 140'''' may not be conformal with the pole 130'''' in the down track direction.

The side shields 140'''' are analogous to the side shields 140, 140', 140'' and 140'''. Although shown only as side shields 140'''', in other embodiments, the shields 140'''' may form a wraparound shield. Although not shown, a portion of the side shield(s) 140'''' that is not shown may extend in a direction perpendicular to the stripe height and down track directions.

The side shields 140'''' include a conformal portion between the ABS and the first throat height TH1'''' and a nonconformal portion between the first throat height and a second throat height TH2''''. An additional nonconformal portion is between the second throat height TH2'''' and a third throat height TH3'. The spacing between the nonconformal portions of the side shields 140'''' and the pole 130'''' varies with distance from the ABS. In the embodiment shown in FIGS. 12-13, the spacing between the pole 130'''' and the side shields 140'''' increases monotonically with distance from the ABS in the nonconformal regions. However, other variations in the spacing between the pole 130'''' and the side shields 140'''' are possible. In some embodiments, the thickness of the side shields 140'''' is TH3'. The nonconformal portion of the shields 140'''' closest to the ABS has a takeoff angle, $\alpha''''$, from a plane parallel to the ABS. In some embodiments, the takeoff angle is at least fifteen degrees and not more than thirty degrees. However, in other embodiments, the takeoff angle may have another value. In some embodiments, the takeoff angle is significantly smaller than the nose chisel angle, resulting in the side shields 140'''' rapidly diverging from the pole 130''''. The additional nonconformal portion of the shields 140'''' has an additional takeoff angle, $\gamma$, from a plane parallel to the ABS. Although a certain number of nonconformal portions and conformal portions are shown for each shield, another number of nonconformal portions and/or another number of conformal portions may be included in the side shields 140. Each nonconformal portion may adjoin another nonconformal portion having a different takeoff angle and/or may adjoin a conformal portion The third throat height, which may also be the side shield depth, may be at least one hundred nanometers. In some embodiments, the third throat height is at least two hundred fifty and not more than five hundred nanometers. The first throat height is at least thirty nanometers. In some embodiments, the first throat height is at least sixty nanometers and not more than one hundred fifty nanometers. In some such embodiments, the first throat height is not more than sixty nanometers. In the embodiment shown, the side shields 140''' also have a conformal portion that extends from the ABS to the first throat height TH1'''. The conformal portion resides between the nonconformal portion of the side shields 140'''' and the ABS.

The transducer 110'''' may share the benefits of the transducers 110, 110', 110'' and 110'''. Use of the side shields 140'''' having nonconformal portions may improve the performance of the transducer 110'''' and thus the head 100''''. Because the side shields 140'''' are still present, ATI and WATER may be mitigated. The ability of the side shields 140'''' to reduce ATI and WATER may be enhanced by the presence of the conformal region near the ABS. However, because the side shields 140'''' diverge from the pole 130'''' in the nonconformal regions, less of the magnetic field provided by the pole 130'''' is shielded from the media (not shown) by the side shields 140''''. Thus, a higher write field may be provided by the pole 130''''. In addition, the field gradient for the pole 130'''' may also be improved. Thus, performance of the transducer 110'''', particularly at higher recording densities may be improved.

Figure 14:
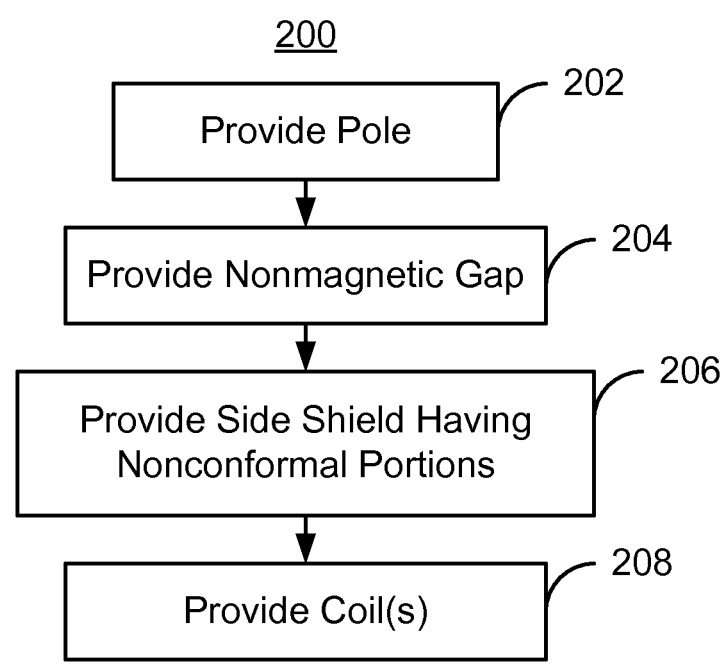
FIG. 14 is a flow chart depicting another exemplary embodiment of a method for fabricating side shields for a magnetic recording transducer.

FIG. 14 is a flow chart depicting an exemplary embodiment of a method 200 for fabricating a transducer, such as the transducer 110, 110', 110'', 110''' and/or 110''''. The method 200 may be used in fabricating transducers such as PMR or energy assisted magnetic recording (EAMR) transducers, though other transducers might be so fabricated. For simplicity, some steps may be omitted, performed in another order, and/or combined. The method 200 is described in the context of the transducer 110. However, in other embodiments, the method 200 may be used in fabricating other transducers including but not limited to the transducer 110', 110'', 110''', and/or 110''''. The method 200 is also described in the context of an ABS location. The ABS location is the location at which the ABS will be, for example after lapping of the transducer. Further, although termed a side shield, the shield(s) fabricated may include wraparound shields having at least top and side portions. The method 200 also may commence after formation of other portions of the transducer. The method 200 is also described in the context of providing a single set of side shields and their associated structures in a single magnetic recording transducer. However, the method 200 may be used to fabricate multiple transducers at substantially the same time. The method 200 and system are also described in the context of particular layers. However, in some embodiments, such layers may include multiple sub-layers. In one embodiment, the method 200 commences after formation of a nonmagnetic intermediate layer. In some embodiments, the intermediate layer is an aluminum oxide layer. The nonmagnetic intermediate layer as well as the pole may reside on an underlayer. Further, in some embodiments, a leading edge shield and/or a leading edge bevel are desired. In such embodiments, the leading edge shield may be provided under the underlayer. The leading edge shield is generally ferromagnetic, magnetically soft, and may include materials such as NiFe. In such embodiments, the underlayer may also have a sloped surface corresponding to the leading edge bevel desired in the pole. In such embodiments, the sloped surface may extend to the ABS location or a surface perpendicular to the ABS location may be between the sloped surface and the ABS location. In addition to the pole, a nonmagnetic gap layer may reside between the sidewalls of the pole and the nonmagnetic layer. In some embodiments, part of the nonmagnetic gap layer may also be under the pole. In some embodiments, a pole seed layer is also provided. The pole seed layer may be magnetic or nonmagnetic. In addition, prior to the method 200 commencing, a portion of the underlayer may be removed, forming a trench in which the side shield is to be fabricated. The seed layer for the side shield may be deposited prior to the method 200 starting.

A pole 130 is provided, via step 202. Step 202 may include plating or otherwise depositing material(s) for the pole 130. Step 130 may also include forming any leading and/or trailing edge bevels in the pole such that the pole is thinner in the down track direction than the yoke.

A nonmagnetic gap layer 120 is provided, via step 204. In some embodiments, step 204 may be performed before step 202. For example, if a portion of the gap 120 resides below the pole, then step 204 may be performed first.

The side shields 140 are provided, via step 206. Thus, step 206 may include depositing the materials for the side shield (s) 140. In addition, one or more masks may be used such that the side shield(s) 140 have one or more nonconformal regions. In some embodiments, the side shields 140 also have conformal region(s). In step 206, the desired throat height(s) and takeoff angles of the conformal and/or nonconformal portions of the side shields 140 are also formed. Thus, the side shields 140, 140', 140'', 140''' and/or 140'''' may be fabricated. The coils 114 are also provided, via step 208.

Thus, using the method 200, the transducer 110, 110', 110'', 110''', and/or 110'''' and head 100 may be fabricated. Further, characteristics of one or more of the transducers 110, 110', 110'', 110''' and/or 110'''' may be combined. Thus, performance and fabrication of the head 100 may be improved.

We claim:

1. A magnetic recording transducer having air-bearing surface (ABS) comprising:
a pole having a pole tip proximate to the ABS;
a side shield having at least one nonconformal portion and a conformal portion between the ABS and the at least one nonconformal portion, the conformal portion extending to the throat height from the ABS in the stripe height direction and being conformal with the pole, the conformal portion adjoining and sharing an edge with a first nonconformal portion of the at least one nonconformal portion, the at least one nonconformal portion extending from a throat height in a stripe height direction perpendicular to the ABS and being nonconformal with the pole, the first nonconformal portion of the at least one nonconformal portion having a takeoff angle configured such that a spacing between the first nonconformal portion of the at least one nonconformal portion and the pole increases with increases in a distance from the ABS, the takeoff angle being at least fifteen degrees and not more than thirty degrees as measured from the ABS;
a nonmagnetic gap between the side shield and the pole, the nonmagnetic gap having a first portion and at least a second portion, the first portion of the nonmagnetic gap being between the conformal portion and the pole, the at least the second portion of the nonmagnetic gap being between the at least one nonconformal portion and the pole, the first portion of the nonmagnetic gap having a substantially constant thickness; and
at least one coil for energizing the pole.

2. The magnetic recording transducer of claim 1 wherein the throat height is at least thirty nanometers.

3. The magnetic recording transducer of claim 2 wherein the throat height is at least sixty nanometers and not more than one hundred fifty nanometers.

4. The magnetic recording transducer of claim 3 wherein the throat height is not more than ninety nanometers.

5. The magnetic recording transducer of claim 1 wherein the at least one side shield has a total depth from the ABS of at least one hundred nanometers.

6. The magnetic recording transducer of claim 5 wherein the total depth from the ABS of at least two hundred fifty nanometers and not more than five hundred nanometers.

7. The magnetic recording transducer of claim 1 wherein the at least one nonconformal portion includes a single nonconformal portion.

8. A magnetic recording transducer having air-bearing surface (ABS) comprising:
a pole having a pole tip proximate to the ABS;
at least one side shield having a conformal portion and at least one nonconformal portion, the conformal portion extending a throat height from the ABS in a stripe height direction substantially perpendicular to the ABS, the conformal portion being conformal with the pole, the at least one nonconformal portion including a first nonconformal portion adjoining and sharing an edge with the conformal portion, the first nonconformal portion extending from the throat height in the stripe height direction and having a takeoff angle configured such that a spacing between the first nonconformal portion and the pole increases with increase in a distance from the ABS, the takeoff angle being at least fifteen degrees and not more than thirty degrees as measured from the ABS, the throat height being at least sixty nanometers and not more than one hundred fifty nanometers, the at least one takeoff angle being at least fifteen degrees and not more than thirty degrees as measured from the ABS, the at least one side shield having a total depth from the ABS of at least one hundred nanometers;

a nonmagnetic gap, a first portion of the nonmagnetic gap being between the conformal portion and the pole, at least a second portion of the nonmagnetic gap being between the at least one nonconformal portion and the pole, the first portion of the nonmagnetic gap having a substantially constant thickness, the at least one takeoff angle being configured such that the at least the second portion of the nonmagnetic gap has at least one thickness that increases with increasing distance from the ABS; and at least one coil for energizing the pole.

9. A disk drive comprising:

a media;

a slider; and a magnetic recording transducer coupled with the slider and having an air-bearing surface (ABS), a pole, a side shield, a nonmagnetic gap and a coil, the pole having a pole tip proximate to the ABS, the side shield having a conformal portion and at least one nonconformal portion, the conformal portion being between the ABS and the at least one nonconformal portion, a first nonconformal portion of the at least one nonconformal portion extending from a throat height in a stripe height direction perpendicular to the ABS, adjoining the conformal portion, sharing an edge with the conformal portion and being nonconformal with the pole, the first nonconformal portion of the at least one nonconformal portion having a takeoff angle configured such that a spacing between the first nonconformal portion of the at least one nonconformal portion and the pole increases with increases in a distance from the ABS, the takeoff angle being at least fifteen degrees and not more than thirty degrees as measured from the ABS, the nonmagnetic gap between the side shield and the pole; and at least one coil for energizing the pole.

10. A method for providing magnetic recording transducer having air-bearing surface (ABS) comprising:

providing a pole having a pole tip proximate to the ABS;

providing a nonmagnetic gap;

providing a side shield having at least one nonconformal portion and a conformal portion between the ABS and the at least one nonconformal portion, the nonmagnetic gap residing between the side shield and the pole, the conformal portion extending to the throat height from the ABS in the stripe height direction, the conformal portion being conformal with the pole, the conformal portion adjoining and sharing an edge with a first nonconformal portion of the at least one nonconformal portion, the at least one nonconformal portion extending from a throat height in a stripe height direction perpendicular to the ABS and being nonconformal with the pole, the first nonconformal portion of the at least one nonconformal portion having a takeoff angle configured such that a spacing between the first nonconformal portion of the at least one nonconformal portion and the pole increases with increases in a distance from the ABS, the takeoff angle being at least fifteen degrees and not more than thirty degrees as measured from the ABS, the nonmagnetic gap having a first portion and at least a second portion, the first portion of the nonmagnetic gap being between the conformal portion and the pole, the at least the second portion of the nonmagnetic gap being between the at least one nonconformal portion and the pole, the first portion of the nonmagnetic gap having a substantially constant thickness; and providing at least one coil for energizing the pole.

11. The method of claim 10 wherein the throat height is at least thirty nanometers.

12. The method of claim 11 wherein the throat height is at least sixty nanometers and not more than one hundred fifty nanometers.

13. The method of claim 12 wherein the throat height is not more than ninety nanometers.

14. The method of claim 10 wherein the at least one side shield has a total depth from the ABS of at least one hundred nanometers.

15. The method of claim 14 wherein the total depth from the ABS of at least two hundred fifty nanometers and not more than five hundred nanometers.

16. The method of claim 11 wherein the at least one nonconformal portion includes a single nonconformal portion.

* * * * *